United States Patent
Costa

(10) Patent No.: US 6,837,002 B2
(45) Date of Patent: Jan. 4, 2005

(54) TRAY FOR HYDROPONIC AND AEROPONIC CULTIVATION

(75) Inventor: Giancarlo Costa, San Dona' Di Piave (IT)

(73) Assignee: Said S.p.A., Isola Vicentina (IT)

( * ) Notice: Subject to any disclaimer, the term of this patent is extended or adjusted under 35 U.S.C. 154(b) by 0 days.

(21) Appl. No.: 10/239,442

(22) PCT Filed: Mar. 19, 2001

(86) PCT No.: PCT/EP01/03137

§ 371 (c)(1),
(2), (4) Date: Sep. 19, 2002

(87) PCT Pub. No.: WO01/70013

PCT Pub. Date: Sep. 27, 2001

(65) Prior Publication Data

US 2003/0056437 A1 Mar. 27, 2003

(30) Foreign Application Priority Data

Mar. 20, 2000 (IT) ..................................... MI2000A0582

(51) Int. Cl.⁷ .............................................. A01G 31/02
(52) U.S. Cl. ............................. 47/60; 47/62 R; 47/66.1
(58) Field of Search ........................ 47/59 R, 60, 62 R, 47/62 A, 62 C, 62 N, 62 E, 79, 85, 86, 65.9, 66.1, 41.01, 41.11, 41.12, 41.14; 52/11, 12

(56) References Cited

U.S. PATENT DOCUMENTS

| 3,603,034 A | 9/1971 | Maxwell-Stewart |
| 4,120,119 A | 10/1978 | Engel |
| 4,190,988 A * | 3/1980 | Carreiro ........................ 52/16 |
| 4,771,572 A | 9/1988 | Higa |
| 5,524,383 A * | 6/1996 | Sanko et al. .................... 47/60 |
| 6,209,260 B1 * | 4/2001 | Surette ....................... 47/65.5 |
| 2003/0056437 A1 * | 3/2003 | Costa .......................... 47/62 R |

FOREIGN PATENT DOCUMENTS

| DD | 17 57 736 B | 5/1971 | |
| DD | 37 28 812 A1 | 10/1988 | |
| DE | 297544 A5 * | 1/1992 | ............ A01G/9/02 |
| EP | 0 876 755 A2 | 11/1998 | |
| JP | 8-116811 * | 5/1996 | .......... A01G/25/06 |

* cited by examiner

Primary Examiner—Jeffrey L. Gellner
(74) Attorney, Agent, or Firm—Abelman, Frayne & Schwab

(57) ABSTRACT

A modular type tray (1) for hydroponic and aeroponic cultivation is described, in which the nutritive solution is carried to the roots of plants grown in the tray by a tube with built-in drips (2) situated in a slot (3) on the tray bottom. The tray consists of at least one plastic casing made by extrusion, a pair of closing flanges (5, 6) to be fixed to the opposite tray ends and (if necessary) at least one middle flange (7), placed between two plastic casings to join them together with a watertight seal.

21 Claims, 8 Drawing Sheets

TRAY FOR HYDROPONIC AND AEROPONIC CULTIVATION

FIELD OF THE INVENTION

Figure 1:
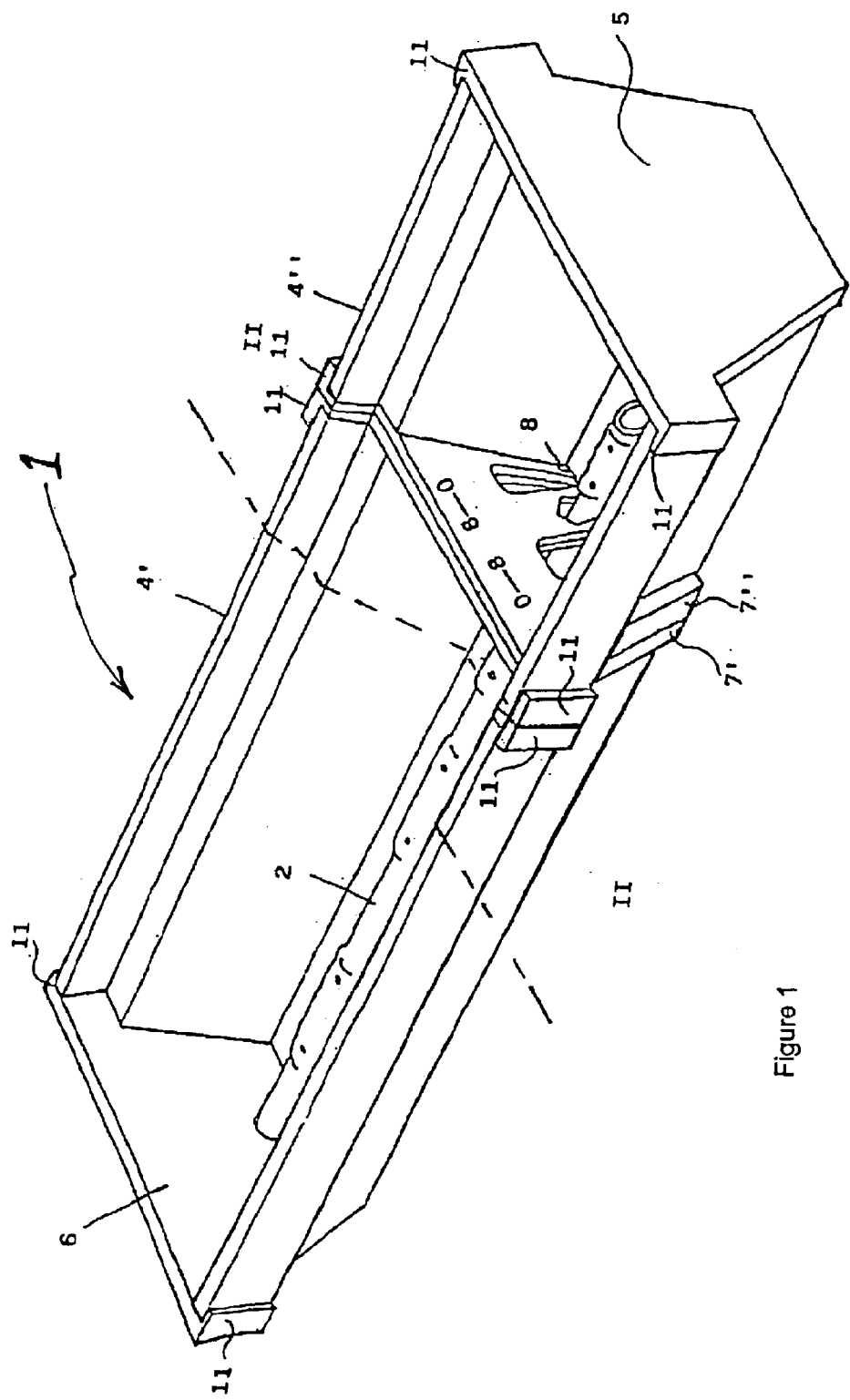

The invention consists of a modular type tray for hydroponic and aeroponic cultivation, in which the nutritive solution is carried to the roots of plants grown in the tray by a tube with built-in drips situated in a slot on the tray bottom.

The tray consists of at least one plastic casing made by extrusion, a pair of closing flanges to apply to the opposite ends of the tray and (if necessary) at least one middle flange, placed between two plastic casings to join them together with a watertight seal.

Previous Technique

Systems for hydroponic and aeroponic cultivation are known and widely used for some time which include a large number of fixed or moveable trays usually situated inside one or more greenhouses: the plants are held and carried by support means belonging to the trays so that their roots stick out from the support means inside the trays.

To provide the plants with water and nutrients necessary for their growth, their roots are supplied with a nutritive solution (coming from one or more containers) which, in the known type systems, is regularly put in the tray area underlying the plant support means by tubes with nozzles (or other equivalent means) situated on the tray bottoms.

The known systems for aeroponic cultivation have (or may have) high system and running costs due to the fact that (very often) the prototype stage has not been surpassed and/or that complicated and expensive engineering solutions have been adopted which are not justified by any benefits gained.

In addition, the use of tubes with sprinkler nozzles to carry the nutritive solution to the plant roots needs the solution to be under pressure (typically at 2–3 atmospheres): this entails (or may entail) considerable costs for the realisation and operation of the nutritive solution delivery circuit, since it is necessary to use fairly powerful pumps (with high energy consumption) to pressurize the nutritive solution and make it circulate, as well as choose the appropriate connection parts between the various tube pieces and make the connections carefully so as to avoid breaks in the connection parts and/or leaks of the pressurized fluid, and so on.

Extensive studies and research carried out by the applicant have shown that, without undermining the characteristics (productivity, etc.) of a hydroponic and aeroponic cultivation system, it is possible to replace the tubes having sprinkler nozzles used in known type trays with tubes having built-in drips, situated on the tray bottom, which have the advantage of supplying a nutritive solution at ambient pressure, allowing less powerful circulation pumps to be used (with lower energy consumption) to circulate the nutritive solution, and the use of less robust connection parts between the various tube pieces (and, accordingly, less expensive) and reduce the times (and, accordingly, the costs) necessary to carry out the same joints.

Subject of the present invention is a tray for hydroponic and aeroponic cultivation, capable of being produced on an industrial scale, that allows optimum plant cultivation by carrying the nutritive solution to their roots through tubes with built-in drips situated on the tray bottom, thus overcoming and/or eliminating the limitations and/or defects experienced previously by known type trays for hydroponic and aeroponic cultivation.

SUMMARY OF THE INVENTION

The tray consists of at least one plastic casing made by extrusion, a pair of closing flanges to apply to the opposite ends of the tray and (if necessary) at least one middle flange, placed between two adjacent plastic casings to join them together with a watertight seal.

LIST OF FIGURES

Figure 2:
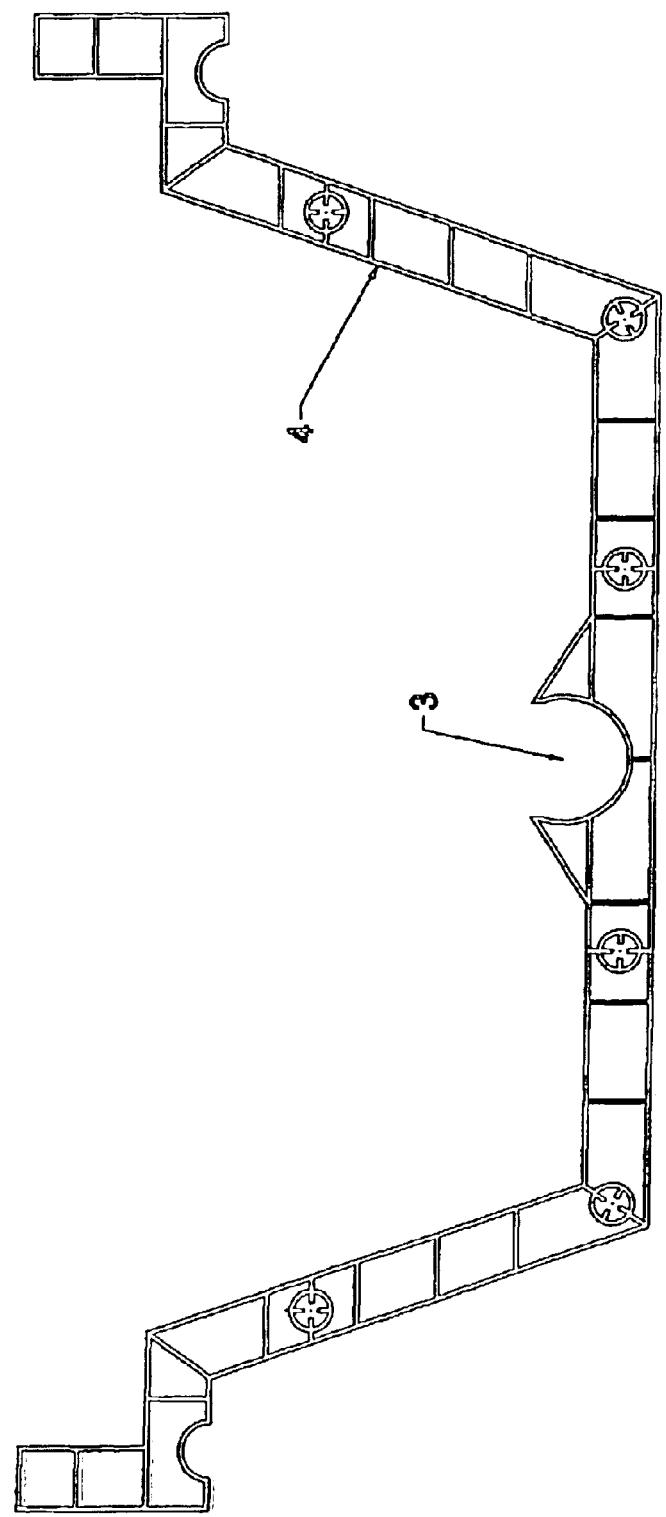
Figure 3:
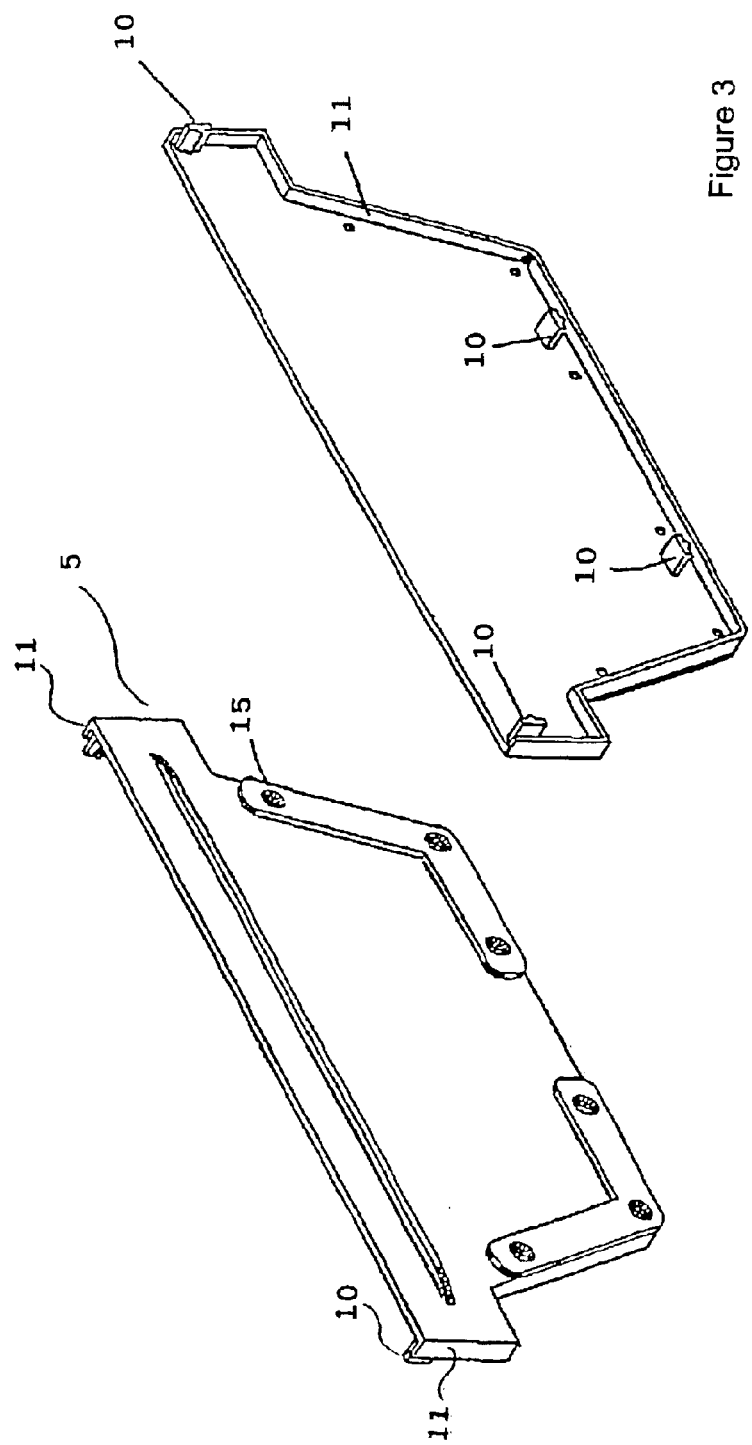
Figure 4:
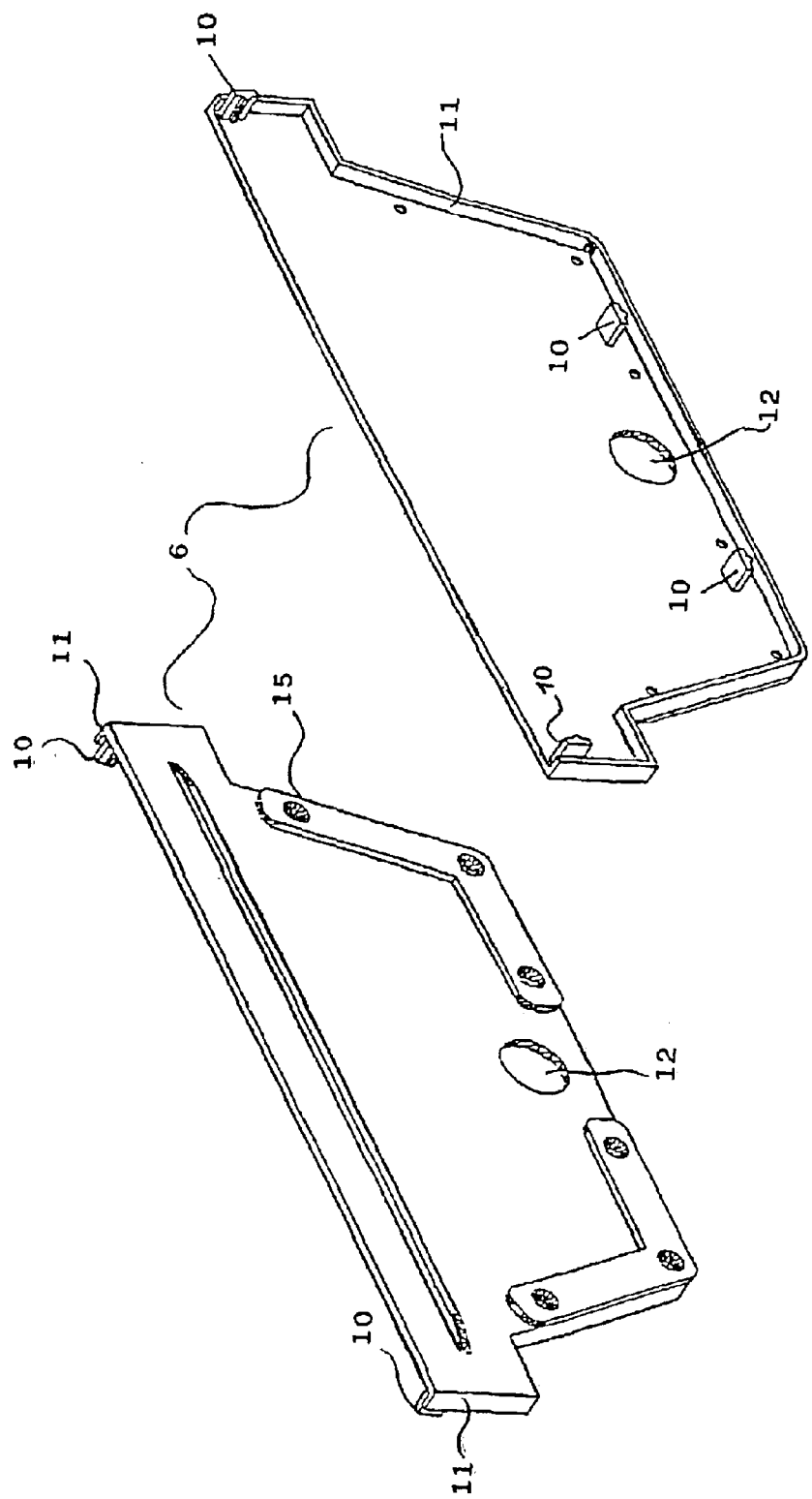
Figure 5:
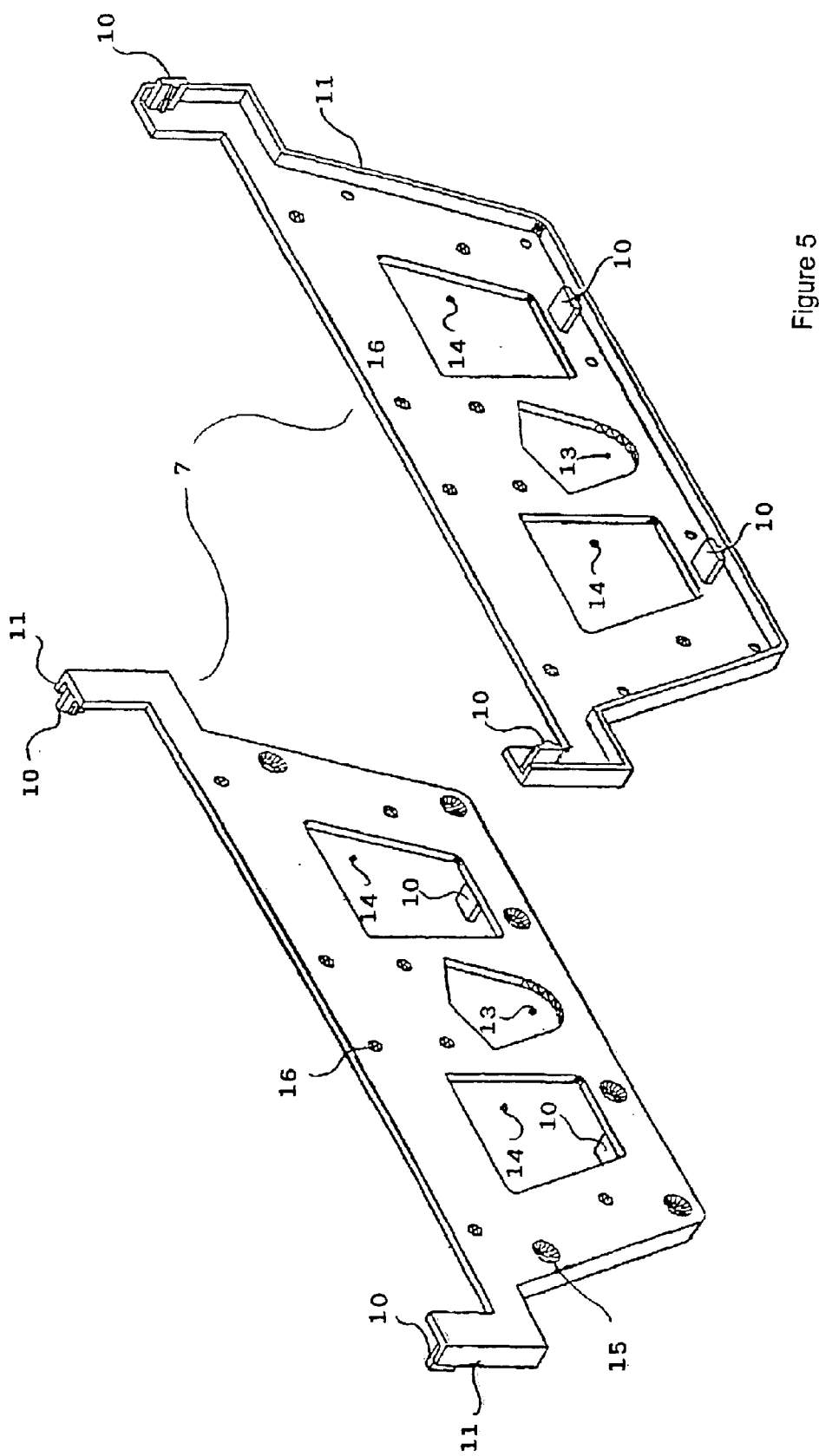
Figure 6:
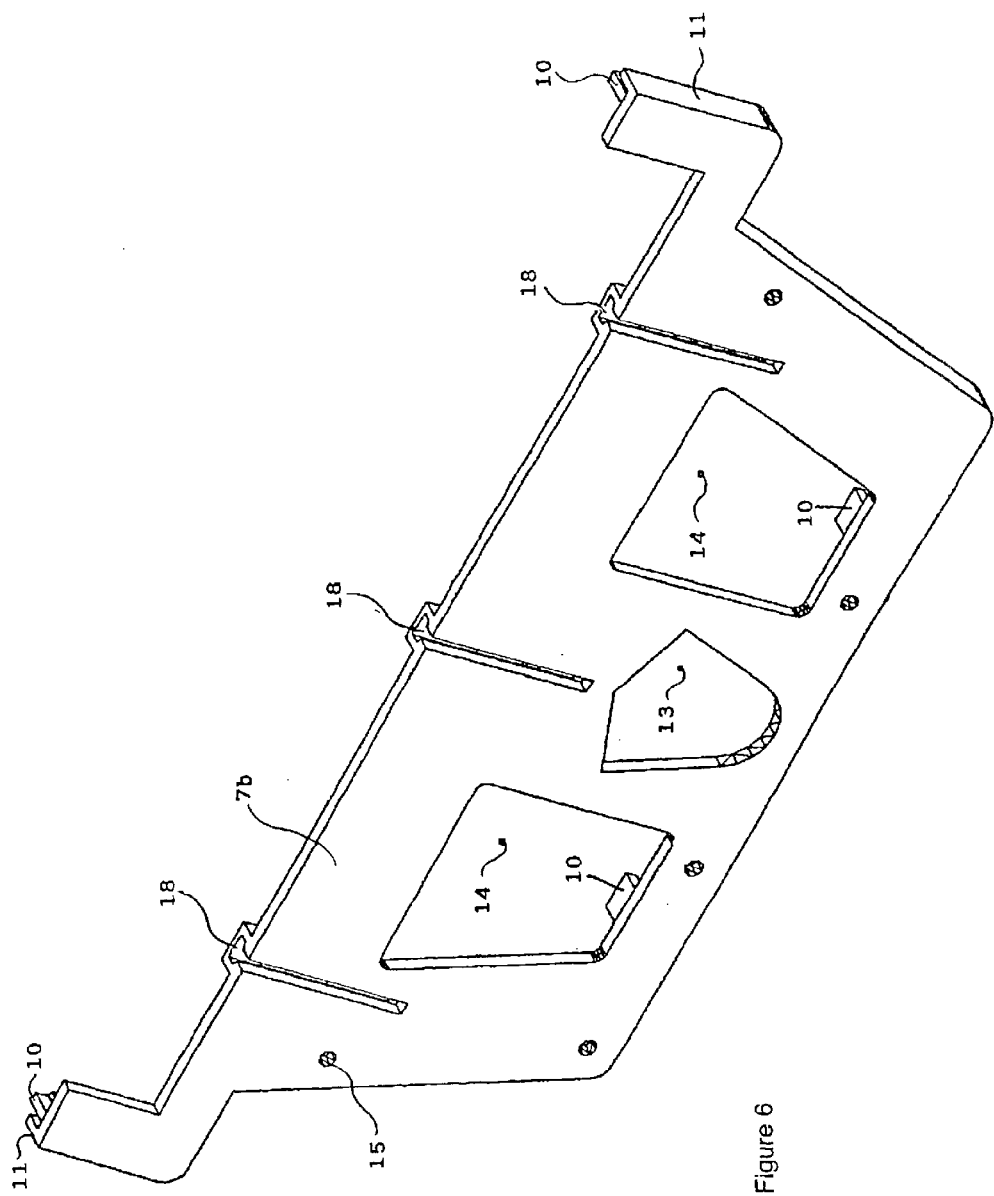
Figure 7:
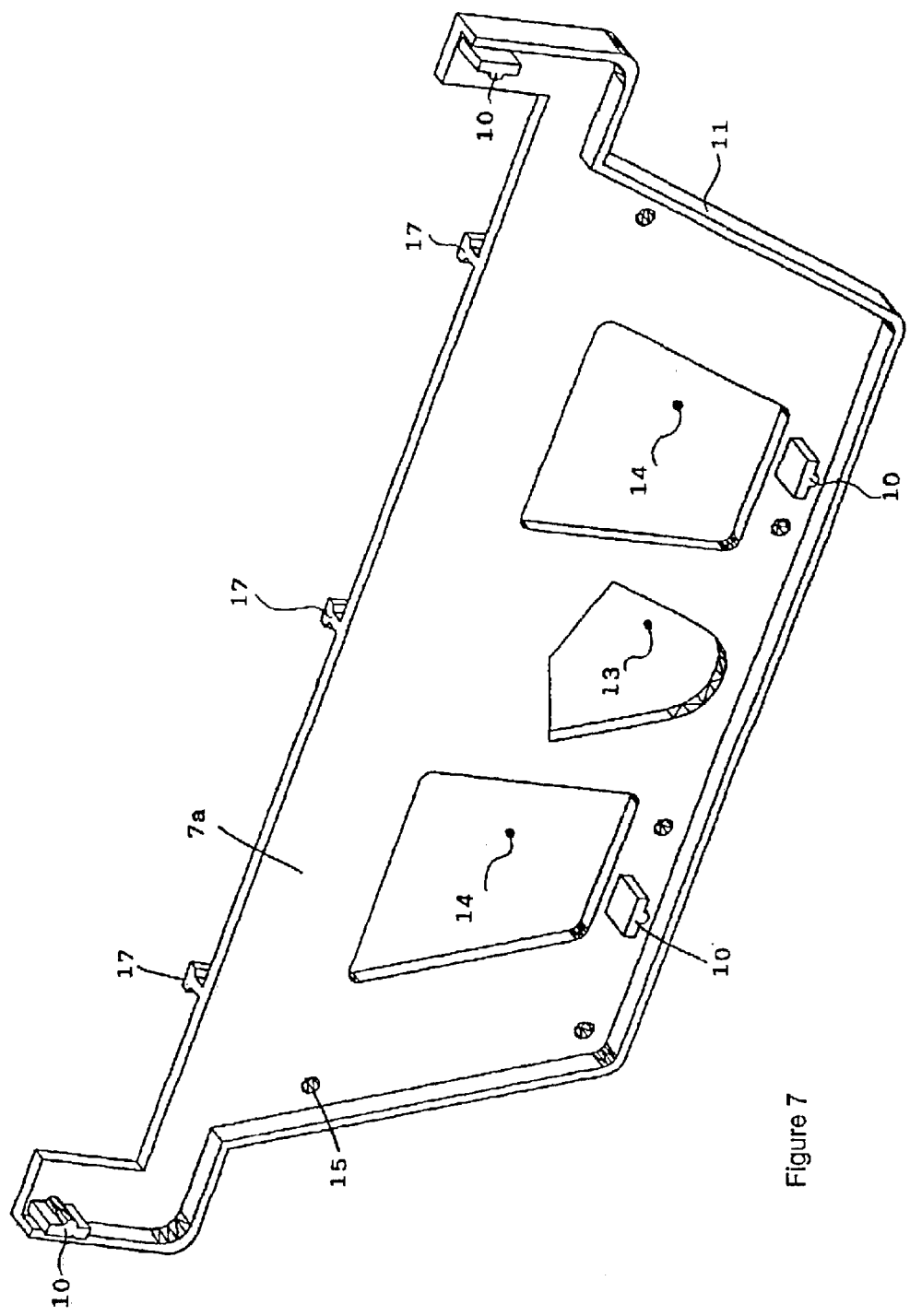
Figure 8:
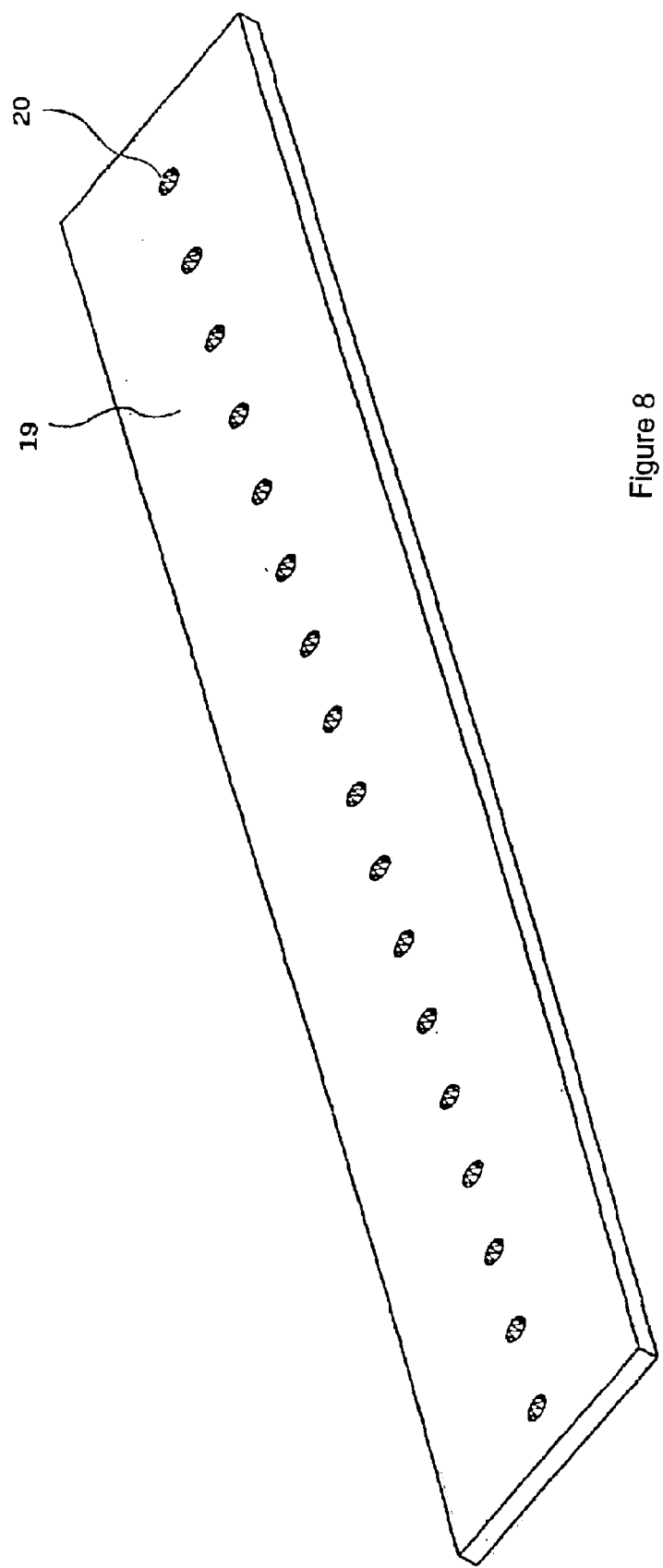

The invention will now be better described with reference to non-limiting embodiments shown in the enclosed figures, in which:

FIG. 1 shows a perspective view of a tray made according to the invention;

FIG. 2 schematically shows a cross-section of one of the casings belonging to the tray of FIG. 1;

FIG. 3 schematically shows the perspective views of the two sides of a first closing flange;

FIG. 4 schematically shows the perspective views of the two sides of a second closing flange;

FIG. 5 schematically shows the perspective views of the two sides of a middle flange;

FIGS. 6 and 7 schematically show the perspective views of the external side of a first flange, respectively the internal side of a second flange belonging to an additional pair of middle flanges;

FIG. 8 shows a perspective view of the support means of the plants grown in a tray produced according to the invention.

DETAILED DESCRIPTION OF THE INVENTION

The subject of the present invention is a tray 1 for hydroponic and aeroponic cultivation, in which the nutritive solution is carried to the roots of the plants grown by a tube with built-in drops 2 situated in a slot 3 made on the tray bottom 1. Such plants are held by support means that close the upper opening of tray 1; an embodiment of such support means will be described as a non-limiting example with reference to FIG. 8.

The nutritive solution which remains unabsorbed by the plant roots collects on the tray bottom 1, from where it flows out through a hole made in the tray bottom 1 and a tube applied to such hole and/or in another way in itself known; in the enclosed figures the means for the outflow of the nutritive solution have been omitted for simplicity of graphic representation.

FIG. 1 shows a perspective view of a non-limiting embodiment of a modular type tray 1, made according to the invention: in FIG. 1 the tray 1 includes a pair of casings 4 (4,' 4") joined together but, without leading away from the scope of the invention, tray 1 can include a single casing 4 or three or more casings 4 to adapt itself better to the specific needs of each user.

Still without leading away from the scope of the invention, it is possible to choose the length of casing 4 each time (respectively that of each of the two or more casings 4 to be joined together) able to better meet the specific needs of the user. A tray 1 made according to the invention which includes at least one casing 4 and a pair of closing flanges (5, 6; FIGS. 3 and 4) to apply to the opposite ends of tray 1; the tray 1 of FIG. 1 consists of a pair of casings 4 (4,' 4"), of the closing flanges (5, 6) and of a pair of middle flanges 7 (7' and 7", FIGS. 5; 7a and 7b, FIGS. 6 and 7), placed between the two adjacent casings 4 (4,' 4") to connect them together with a watertight seal: each middle flange (7,' 7"; 7a, 7b) is fixed to one end of one of the casings 4 (4,' 4").

FIG. 1 also shows the projecting edges 11, present along the perimeter of the internal side (i.e. of that in contact with one end of the casing 4) of the closing flanges (5, 6; FIGS. 3 and 4) and the middle ones 7 (FIGS. 5, 6 and 7), able to be elastically placed on the corresponding end of the casing 4 to fix the flange (5, 6, 7) to the end of casing 4: such projecting edges 11 are not obviously present at the upper edges of the flanges (5, 6, 7), which are not in contact with the casing 4. Preferably, but not necessarily, the casings 4 are plastic and made by extrusion.

In the embodiment of FIG. 1 each middle flange 7 (7,' respectively 7") is fixed to one end of a casing 4 (4,' respectively 4") and two adjacent middle flanges (7,' 7") are joined together by a number of bolts 8 (or other functionally equivalent reversible connection means).

Obviously, a tray 1 including at least three casings 4 includes at least two pairs of middle flanges 7 (placed between two adjacent casings 4); each middle flange 7 (7,' 7") of each pair of flanges is fixed to one end of one of the casings 4 (4,' respectively 4") and the adjacent middle flanges 7 are joined together by bolts 8 (or other functionally equivalent reversible connection means).

FIG. 1 also shows the tube with built-in drips 2 situated in slot 3 (better illustrated in the cross-section of FIG. 2) made on the bottom of casings 4 which make up the tray 1.

FIG. 2 schematically shows a cross-section of a preferred embodiment of a casing 4 belonging to tray 1, sectioned according to the plane II—II of FIG. 1; FIG. 2 shows the slot 3 made on the bottom of the casing 4, while the tube with built-in drips 2 has been omitted for simplicity of graphic representation.

In the embodiment example shown in FIG. 2, the casing 4 has a "honeycomb" structure allowing the attainment of a rigid, strong casing but which is also light, inexpensive and easily obtainable by extrusion; in the preferred embodiment described here, the internal side of the closing flanges (5, 6; FIGS. 3 and 4) and the middle ones 7 (FIGS. 5, 6 and 7) have projecting tabs 10 able to be inserted into the "honeycomb" structure of the casing 4 to fix the flange (5, 6 or 7) to the end of the casing 4.

FIG. 3 schematically shows the perspective views of the two sides of a first closing flange 5; FIG. 3 shows the projecting tabs 10 and the projecting edge 11, able to fix the closing flange 5 to the end of the casing 4.

FIG. 4 schematically shows the perspective views of the two sides of a second closing flange 6, which differs from the one shown in FIG. 3 basically since it has a hole 12 at the centre of its lower area that allows the tube with built-in drips 2 (FIG. 1) to enter tray 1, where it is housed in slot 3 made on the bottom of the casings 4 which make up the tray 1 (FIG. 2).

Preferably, but not necessarily, the closing flanges (5, 6) and any middle flanges (7,' 7"; 7a, 7b) are subsequently fixed to the ends of the casing 4 by a number of screws (omitted in the enclosed figures for simplicity of graphic representation) housed in seats envisaged for such purpose in the closing flanges (5, 6) and in the middle ones (7,' 7"; 7a, 7b): in the figures from 3 to 7 one such seat is denoted by reference number 15.

FIG. 5 schematically shows the perspective views of the two sides of a middle flange 7 (7,' 7"), that has at least a hole 13 set at the centre of its lower area and is able to allow the passage of the tube with built-in drips 2 (FIG. 1) and at least one additional hole 14, at the side of hole 13 and able to intercommunicate the two adjacent casings 4 joined together by the two middle flanges 7 (7,' 7") of FIG. 1 to allow the smooth flowing of the nutritive solution into tray 1.

The external side of the middle flange 7 (7,' 7") of FIG. 5 is smooth to allow the watertight sealing of two flanges 7 (7,' 7") joined together, while the internal side 7 of the middle flange 10 has projecting tabs able to be inserted in the "honeycomb" structure of the adjacent casing 4 and the projecting edge 11 able to be placed elastically on the corresponding end of the casing 4 to fix the middle flange 7 to the end of the casing 4.

Finally, in FIG. 5 one of the seats, holding the means 8 able to fasten together two middle flanges (7,' 7"), is denoted by 16.

FIGS. 6 and 7 schematically show the perspective views of the external side of a first flange (7a), respectively of the internal sides of a second flange (7b) belonging to a pair of middle flanges (7a, 7b) that differ from the middle flange 7 shown in FIG. 5 basically since they are joined together by a number of projecting parts 17, carried by one (7b; FIG. 7) of the middle flanges, that (preferably but not necessarily) has a "T" section and which engage in as many seats 18 made in the other flange (flange 7a; FIG. 6) and having a section of complementary shape to that of projecting parts 17.

FIGS. 6 and 7 also show the hole 13 for the passage of the tube with built-in drips 2 (FIG. 1), at least one additional hole 14 that intercommunicates the two adjacent casings 4, the projecting tabs 10 and the projecting edge 11.

FIG. 8 shows, as a non-limiting example, a perspective view of support means 19 (made of polystyrene or other equivalent material) that close the upper opening of a tray 1 made according to the invention; the plants grown in the tray 1 are held by a large number of cone-shaped holes 20 made in the support means 19 and are eliminated together with the support means 19 at the end of their productive cycle.

Preferably, but not necessarily, a layer of black material (or, in any case, of dark colour) is applied to the side of the support means 19 (not shown in FIG. 8) situated inside tray 1 that prevents (or at least hinders) the development of algae and/or other foreign casings inside tray 1.

Without departing from the scope of the invention it is possible for a person skilled in the art to carry out, all the modifications and improvements suggested by normal experience and the natural evolution of the technique, to the tray for hydroponic and aeroponic cultivation subject of the present description.

What is claimed is:

1. A tray for hydroponic and aeroponic cultivation, comprising:
    at least two adjacent casings (4', 4");
    a pair of closing flanges (5, 6) at the respective opposite ends of said casings (4', 4");
    a tube with built-in drips (2) situated in a slot (3) made on the tray bottom (1) suitable for carrying the nutritive solution to the roots of plants grown in said tray (1);
    at least one pair of middle flanges (7', 7"; 7a, 7b) placed between said two adjacent casings (4', 4") to join them together with a watertight seal, each middle flange (7', 7a; respectively 7", 7b) of the at least one pair being fixed to one end of one of said casings (4', respectively 4"); and
    support means (19) closing an upper opening of said tray and suitable for holding the plants to be grown in said tray.

2. A tray as in claim 1, said tray being of modular type.

3. A tray as in claim 1, wherein said slot (3) is made on the bottom of the at least one of said two adjacent casings (4', 4") belonging to the tray (1).

4. A tray as in claim 1, wherein at least one of said two adjacent casings (4', 4") is made of plastic.

5. A tray as in claim 1, wherein at least one of said two adjacent casings (4', 4") is made by extrusion.

6. A tray as in claim 1, wherein at least one of said two adjacent casings (4', 4") has a honeycomb structure.

7. A tray as in claim 1, further comprising a projecting edge (11), along the perimeter of the internal side of said closing flanges (5, 6), able to be placed elastically on the corresponding end of the respective casing (4', 4"),. said projecting edge (11) being omitted at the upper edge of the closing flanges (5, 6).

8. A tray as in claim 1, wherein one of said closing flanges (5, 6) has a hole (12) at the centre of its lower area able to allow said tube with built-in drips (2) to enter the tray (1).

9. A tray as in claim 1, wherein said closing flanges (5, 6) are subsequently fixed to the ends of said at least two adjacent casings (4, 4', 4") by a plurality of screws housed in seats (15) provided for such purpose in said closing flanges (5, 6).

10. A tray as in claim 5, further comprising projecting tabs (10), on the internal side of the closing flanges (5, 6), for insertion into the honeycomb structure of at least one of said at least two adjacent casings (4', 4").

11. A tray as in claim 1, wherein the middle flanges (7', 7") belonging to each pair of middle flanges are joined together by means of a reversible connection (8).

12. A tray as in claim 1, wherein, along the perimeter of the internal side of the middle flanges (7', 7"; 7a, 7b), there is a projecting edge (11) able to be placed elastically on the corresponding end of the respective casing (4', 4"), said projecting edge (11) being omitted at the upper edge of the at least one middle flange (7).

13. A tray as in claim 1, wherein at least one of said at least two adjacent casings (4', 4") has a honeycomb structure, and, on the internal side of said middle flanges (7', 7"; 7a, 7b), there are projecting tabs (10) able to be inserted in the honeycomb structure of the adjacent casings (4', 4").

14. A tray as in claim 1, wherein each middle flange (7', 7"; 7a, 7b) has at least one hole (13) set at the centre of its lower area to allow the passage of the tube with built-in drips (2).

15. A tray as in claim 12, wherein each middle flange (7', 7"; 7a, 7b) also has at least one additional hole (14), at the side of the central hole (13) to intercommunicate the two adjacent casings (4) joined together by the at least one pair of middle flanges (7', 7"; 7a, 7b).

16. A tray as in claim 1, wherein the middle flanges (7a, 7b) belonging to each pair of middle flanges are joined together by a number of projecting parts (17), carried by a middle flange (7b) of said pair (7a, 7b), able to engage in as many seats (18) that are made in the other flange (7a) of said pair (7a, 7b) and which have a section of complementary shape to that of the projecting parts (17).

17. A tray as in claim 14, wherein said projecting parts (17) and said seats (18) having a "T" section.

18. A tray as in claim 1, wherein said middle flanges (7', 7"; 7a, 7b) are subsequently fixed to the ends of the casings (4', 4") by a number of screws held in seats (15) envisaged for such purpose in the middle flanges (7', 7"; 7a, 7b).

19. A tray as in claim 1, wherein said support means (19) have a large number of cone-shaped holes (20) to hold the plants grown in the tray (1).

20. A tray as in claim 1, wherein a layer of dark coloured material is applied to the side of said support means (19) situated inside the tray (1).

21. A tray for hydroponic and aeroponic cultivation, comprising:

at least two adjacent casings (4', 4");

a pair of closing flanges (5, 6) at the respective opposite ends of said casings (4', 4");

a tube with built-in drips (2) situated in a slot (3) made on the tray bottom (1) suitable for carrying the nutritive solution to the roots of plants grown in said tray (1);

at least one pair of middle flanges (7', 7"; 7a, 7b) placed between said two adjacent casings (4,' 4") to join them together with a watertight seal, each middle flange (7', 7a; respectively 7", 7b) of the at least one pair being fixed to one end of one of said casings (4,' respectively 4"); and a support plate (19) closing an upper opening of said tray, said plate having a plurality of cone-shaped holes (20) to support plants grown in said casings (4, 4").

* * * * *